United States Patent
Donoue et al.

(10) Patent No.: US 11,742,481 B2
(45) Date of Patent: Aug. 29, 2023

(54) NONAQUEOUS ELECTROLYTE SECONDARY BATTERY

(71) Applicant: Panasonic Intellectual Property Management Co., Ltd., Osaka (JP)

(72) Inventors: Kazunori Donoue, Hyogo (JP); Hiroki Watanabe, Hyogo (JP); Shinya Miyazaki, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 369 days.

(21) Appl. No.: 16/981,753

(22) PCT Filed: Jan. 22, 2019

(86) PCT No.: PCT/JP2019/001803
§ 371 (c)(1),
(2) Date: Sep. 17, 2020

(87) PCT Pub. No.: WO2019/187538
PCT Pub. Date: Oct. 3, 2019

(65) Prior Publication Data
US 2021/0036321 A1 Feb. 4, 2021

(30) Foreign Application Priority Data
Mar. 30, 2018 (JP) ................. 2018-068634

(51) Int. Cl.
*H01M 4/505* (2010.01)
*H01M 4/525* (2010.01)
*H01M 4/02* (2006.01)

(52) U.S. Cl.
CPC ........... *H01M 4/525* (2013.01); *H01M 4/505* (2013.01); *H01M 2004/021* (2013.01); *H01M 2004/027* (2013.01); *H01M 2004/028* (2013.01)

(58) Field of Classification Search
CPC .. H01M 10/0525; H01M 4/505; H01M 4/525; H01M 4/36–525; H01M 2004/021; H01M 2004/027
See application file for complete search history.

(56) References Cited

U.S. PATENT DOCUMENTS

| | | | |
|---|---|---|---|
| 2004/0110063 A1 | 6/2004 | Uchitomi et al. | |
| 2006/0177737 A1 | 8/2006 | Tode et al. | |
| 2010/0081055 A1 | 4/2010 | Konishi et al. | |
| 2013/0320256 A1 | 12/2013 | Kim et al. | |
| 2014/0147740 A1 | 5/2014 | Kokubu et al. | |
| 2015/0090927 A1 | 4/2015 | Park et al. | |
| 2015/0147655 A1* | 5/2015 | Park | H01M 4/5825 429/231.1 |
| 2018/0131006 A1 | 5/2018 | Kokubu et al. | |
| 2018/0287202 A1 | 10/2018 | Matsushita et al. | |

FOREIGN PATENT DOCUMENTS

| | | |
|---|---|---|
| CN | 101714630 A | 5/2010 |
| CN | 104364944 A | 2/2015 |
| CN | 107636869 A | 1/2018 |
| EP | 2 169 745 A1 | 3/2010 |
| JP | 2003-221236 A | 8/2003 |
| JP | 2010-086693 A | 4/2010 |
| JP | 2016-051504 A | 4/2016 |
| WO | 2005/015663 A1 | 2/2005 |
| WO | 2013/018692 A1 | 2/2013 |
| WO | 2017/056364 A1 | 4/2017 |
| WO | 2017/098714 A1 | 6/2017 |

OTHER PUBLICATIONS

Extended (Supplementary) European Search Report dated Apr. 28, 2021, issued in counterpart EP application No. 19776687.6. (8 pages).
English Translation of Search Report dated Aug. 12, 2022, issued in counterpart CN Application No. 201980005022.8. (3 pages).
International Search Report dated Apr. 9, 2019, issued in counterpart Application No. PCT/JP2019/001803 (2 pages).

* cited by examiner

*Primary Examiner* — Milton I Cano
*Assistant Examiner* — Albert Michael Hilton
(74) *Attorney, Agent, or Firm* — WHDA, LLP

(57) ABSTRACT

A nonaqueous electrolyte secondary battery includes a positive electrode, a negative electrode, and a nonaqueous electrolyte. The positive electrode includes lithium composite oxide particles A and B containing Ni and Mn. The lithium composite oxide particles A include secondary particles a2 that are aggregations of primary particles a1, and contain at least one of zirconium and boron. The lithium composite oxide particles B include at least one of primary particles b1 and secondary particles b2, the primary particles b1 having a larger particle size than the primary particles a1, the secondary particles b2 being aggregations of the primary particles b1 and having a smaller particle size than the secondary particles a2. The mass ratio of the lithium composite oxide particles A to the lithium composite oxide particles B is within the range of 8:2 to 4:6.

5 Claims, 1 Drawing Sheet

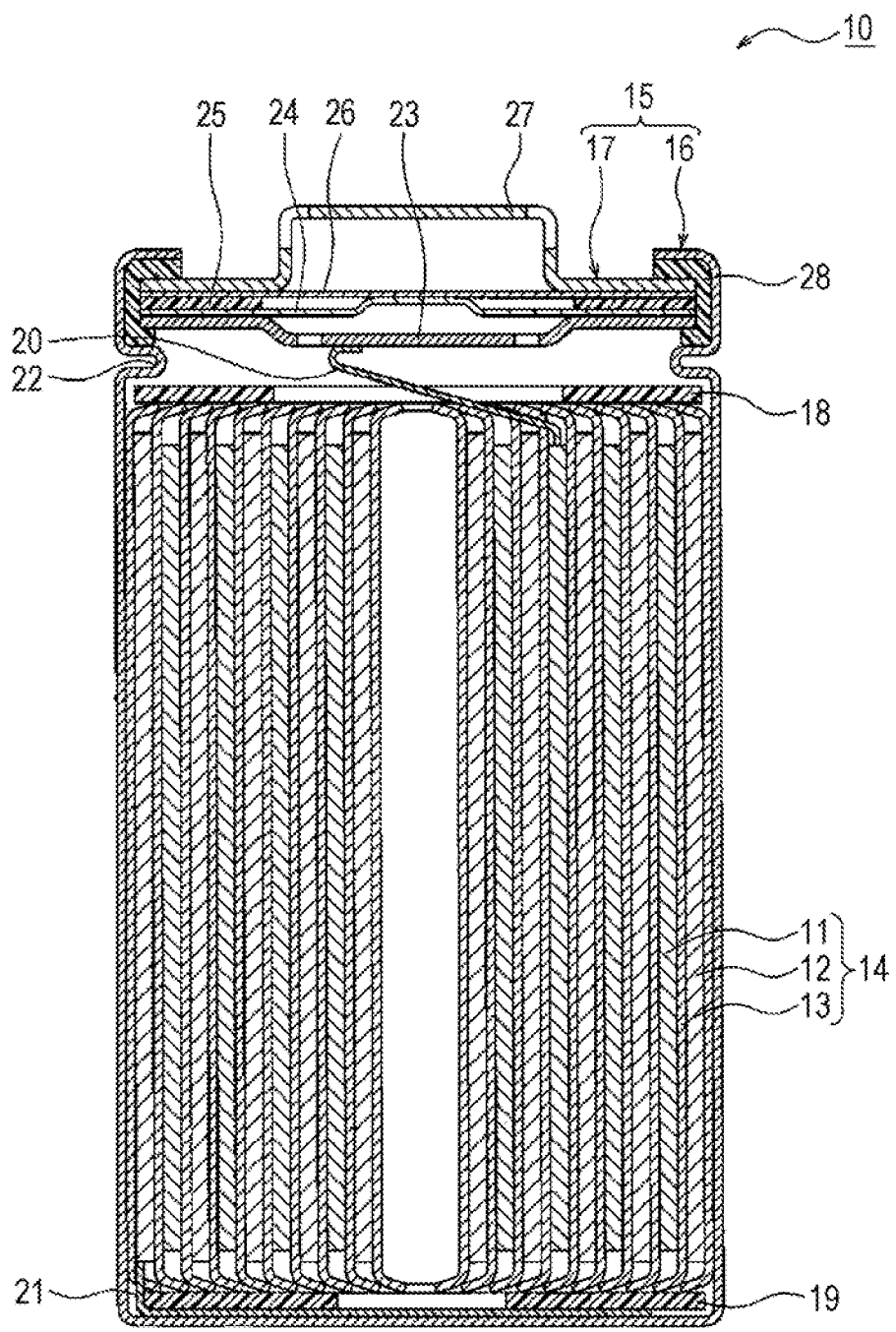

NONAQUEOUS ELECTROLYTE SECONDARY BATTERY

TECHNICAL FIELD

The present invention relates to a technique of nonaqueous electrolyte secondary batteries.

BACKGROUND ART

Nonaqueous electrolyte secondary batteries including a positive electrode, a negative electrode, and a nonaqueous electrolyte, which are charged and discharged by transfer of, for example, lithium ions between the positive electrode and the negative electrode, have been widely used as secondary batteries having high power and high energy density.

To improve battery characteristics, use of lithium composite oxides having different particle sizes for a positive electrode active material for the positive electrode of a nonaqueous electrolyte secondary battery has been known. For example, PTL 1 discloses a positive electrode active material that includes a lithium composite oxide including secondary particles having a relatively large particle size, the secondary particles being aggregations of primary particles having a small particle size, and a lithium composite oxide including secondary particles having a relatively small particle size, the secondary particles being aggregations of primary particles having a small particle size.

CITATION LIST

Patent Literature

PTL 1: Japanese Published Unexamined Patent Application No. 2003-221236

SUMMARY OF INVENTION

Increasing the charge voltage is effective in increasing the energy density of a battery. However, when a nonaqueous electrolyte secondary battery in a related art, in which lithium composite oxides having different particle sizes are used as the positive electrode active material, is stored at high temperature after being charged to a high voltage (e.g., 4.3 V), a problem in which the amount of gas generated in the battery increases arises.

An object of the present disclosure is to provide a nonaqueous electrolyte secondary battery that enables suppression of the amount of gas generated when stored at high temperature after being charged to a high voltage.

A nonaqueous electrolyte secondary battery according to an aspect of the present disclosure includes a positive electrode, a negative electrode, and a nonaqueous electrolyte. The positive electrode includes lithium composite oxide particles A and B containing Ni and Mn. The lithium composite oxide particles A include secondary particles a2 that are aggregations of primary particles a1, and contain at least one of zirconium and boron. The lithium composite oxide particles B include at least one of primary particles b1 and secondary particles b2, the primary particles b1 having a larger particle size than the primary particles a1, the secondary particles b2 being aggregations of the primary particles b1 and having a smaller particle size than the secondary particles a2. The mass ratio of the lithium composite oxide particles A to the lithium composite oxide particles B is within the range of 8:2 to 4:6.

An aspect of the present disclosure provides a nonaqueous electrolyte secondary battery that enables suppression of the amount of gas generated when stored at high temperature after being charged to a high voltage.

BRIEF DESCRIPTION OF DRAWING

FIG. 1 is a cross sectional view of an exemplary nonaqueous electrolyte secondary battery according to an embodiment.

DESCRIPTION OF EMBODIMENTS

A nonaqueous electrolyte secondary battery according to an aspect of the present disclosure includes a positive electrode, a negative electrode, and a nonaqueous electrolyte. The positive electrode includes lithium composite oxide particles A and B containing Ni and Mn. The lithium composite oxide particles A include secondary particles a2 that are aggregations of primary particles a1, and contain at least one of zirconium and boron. The lithium composite oxide particles B include at least one of primary particles b1 and secondary particles b2, the primary particles b1 having a larger particle size than the primary particles a1, the secondary particles b2 being aggregations of the primary particles b1 and having a smaller particle size than the secondary particles a2. The mass ratio of the lithium composite oxide particles A to the lithium composite oxide particles B is within the range of 8:2 to 4:6. The reason that the amount of gas generated is suppressed when such a nonaqueous electrolyte secondary battery is stored at a high temperature (e.g., stored at 60° C.) after being charged to a high voltage (e.g., 4.3 V) is not sufficiently clear and may be as follows.

It is considered that a reason for the gas generation during storage at high temperature is metal elution from a lithium composite oxide. When a battery is stored at high temperature after being charged to a high voltage, the amount of metal eluted from the lithium composite oxide increases and the amount of gas generated tends to increase. It is presumed that in a nonaqueous electrolyte secondary battery according to an aspect of the present disclosure, addition of zirconium or boron to lithium composite oxide particles leads to, for example, stabilizing the crystal structure and the electrochemical activity on the surface of particles, thereby suppressing the amount of metal eluted. The amount of metal eluted from the lithium composite oxide particles A including secondary particles a2, which are aggregations of primary particles a1 having a relatively small particle size compared with the lithium composite oxide particles B and have a relatively large particle size compared with the lithium composite oxide particles B, is larger than that from the lithium composite oxide particles B. Thus, it is necessary to add zirconium or boron at least to the lithium composite oxide particles A. Only the lithium composite oxide particles A to which zirconium or boron is added does not sufficiently suppress the amount of gas generated when a battery is stored at high temperature after being charged to a high voltage. Thus, an appropriate amount of lithium composite oxide particles B including the primary particles b1 or the secondary particles b2, the primary particles b1 having a relatively large particle size, the secondary particles b2 being aggregations of the primary particles b1 and having a relatively small particle size compared with the lithium composite oxide particles A, is mixed with the lithium composite oxide particles A, thereby effectively suppressing the amount of gas generated. It is presumed that the mixing ratio of the lithium composite oxide particles A to lithium composite oxide particles B according to the present embodiment results in high filling properties in the positive electrode and contributes to the improvement in battery capacity.

Hereinafter, an embodiment will be described in detail. The FIGURE referred to in the description of the embodiment is schematic. For example, the ratio of dimensions of the components in the FIGURE may be different from that of the actual dimensions.

FIG. 1 is a cross sectional view of an exemplary nonaqueous electrolyte secondary battery according to an embodiment. A nonaqueous electrolyte secondary battery 10 in FIG. 1 includes an electrode body 14, which is formed by winding a positive electrode 11 and a negative electrode 12 together with a separator 13 disposed therebetween, a nonaqueous electrolyte, insulating plates 18 and 19, which are respectively disposed on the upper and lower portions of the electrode body 14, and a battery case 15, which accommodates the above members. The battery case 15 includes a closed-end cylindrical main casing 16 and a sealing body 17, which closes the opening of the main casing 16. Instead of the wound-type electrode body 14, another type of electrode body, such as a stacked-type electrode body formed of a positive electrode and a negative electrode alternately stacked on each other with a separator disposed therebetween, may be used. The battery case 15 may be a cylindrical, prismatic, coin-shape, or button-shape metal case, or a resin case formed by laminating a resin sheet (laminate-type battery).

The main casing 16 may be a closed-end cylindrical metal casing. A gasket 28 is disposed between the main casing 16 and the sealing body 17. This seals the battery reliably. The main casing 16 includes an extending portion 22. The extending portion 22 is, for example, a part of the side portion that extends inward and supports the sealing body 17. The extending portion 22 is preferably formed in an annular shape in a circumferential direction of the main casing 16. The upper surface of the extending portion 22 supports the sealing body 17.

The sealing body 17 has a structure in which a filter 23, a lower valve body 24, an insulation member 25, an upper valve body 26, and a cap 27 are sequentially stacked on each other from the electrode-body-14 side. Each member of the sealing body 17 has, for example, a disk shape or a ring shape. The members except the insulation member 25 are electrically connected to each other. The center portion of the lower valve body 24 and the center portion of the upper valve body 26 are connected to each other. The insulation member 25 is interposed between the peripheral portions of the lower valve body 24 and the upper valve body 26. An increase in the inner pressure of the nonaqueous electrolyte secondary battery 10 due to, for example, heat generation caused by an internal short circuit causes, for example, the lower valve body 24 to deform so as to push up the upper valve body 26 toward the cap 27, and to fracture, thereby interrupting the current path between the lower valve body 24 and the upper valve body 26. A further increase in the inner pressure fractures the upper valve body 26, thereby discharging gas from the opening of the cap 27.

In the nonaqueous electrolyte secondary battery 10 in FIG. 1, a positive electrode lead 20 attached to the positive electrode 11 extends through the through hole of the insulating plate 18 toward the sealing body 17, and a negative electrode lead 21 attached to the negative electrode 12 extends beside the insulating plate 19 to the bottom of the main casing 16. The positive electrode lead 20 is connected to the lower surface of the filter 23, which is the bottom plate of the sealing body 17, by, for example, welding. The cap 27, which is the top plate of the sealing body 17, is electrically connected to the filter 23 and functions as the positive electrode terminal. The negative electrode lead 21 is connected to the inner surface of the bottom of the main casing 16 by, for example, welding. The main casing 16 functions as the negative electrode terminal.

Hereinafter, the positive electrode, the negative electrode, the nonaqueous electrolyte, and the separator will be fully described.

[Positive Electrode]

The positive electrode 11 includes a positive electrode current collector and a positive electrode active material layer formed on such a positive electrode current collector. For the positive electrode current collector, a foil of a metal that is stable within the positive electrode potential range, such as aluminum, or, for example, a film having a surface on which such a metal is disposed may be used.

The positive electrode active material layer contains a positive electrode active material. For example, to bind the positive electrode active material particles together to reliably obtain the mechanical strength of the positive electrode active material layer and to enhance the binding properties between the positive electrode active material layer and the positive electrode current collector, the positive electrode active material layer preferably contains a binder. For example, to improve the electrical conductivity of the positive electrode active material layer, the positive electrode active material layer preferably contains an electrically conductive material.

The positive electrode active material contains lithium composite oxide particles A containing Ni and Mn and lithium composite oxide particles B containing Ni and Mn.

The lithium composite oxide particles A include secondary particles a2, which are aggregations of primary particles a1, and contain at least one of zirconium and boron. The way in which zirconium and boron are contained is not limited. For example, zirconium and boron may be contained in the crystal structures of the lithium composite oxide particles A or may be attached to the surface of the lithium composite oxide particle A (primary particles a1 and secondary particles a2) as a zirconium compound, such as an oxide containing zirconium, or a boron compound, such as an oxide containing boron.

The lithium composite oxide particles B contain at least one of primary particles b1, which have a larger particle size than the primary particles a1 of the lithium composite oxide particles A, and secondary particles b2, which are aggregations of the primary particles b1 and have a smaller particle size than the secondary particles a2 of the lithium composite oxide particles A. For example, to suppress the amount of metal eluted from the lithium composite oxide B, the lithium composite oxide particles B preferably contain at least one of zirconium and boron.

The primary particles b1 of the lithium composite oxide particles B may have any particle size, provided that the particle size is larger than that of the primary particles a1 of the lithium composite oxide particles A. For example, to effectively suppress the amount of gas generated when the battery is stored at high temperature after being charged to a high voltage, or to improve the battery capacity and charging/discharging cycle characteristics, the primary particles b1 preferably have a particle size within the range of 3.0 to 5.0 μm. For example, to effectively suppress the amount of gas generated when the battery is stored at high temperature after being charged to a high voltage, or to improve the battery capacity and charging/discharging cycle characteristics, the primary particles a1 of the lithium composite oxide particles A preferably have a particle size within the range of 0.3 to 0.9 μm. Herein, the particle size of the primary particles is an average particle size measured by the following method.

The positive electrode 11 is embedded in a resin. A cross-section polishing (CP) process may be performed to produce a cross section of the positive electrode 11. The image of the cross section of the positive electrode active material layer is taken by SEM. In another method, the lithium composite oxide particles are embedded in a resin. A cross-section polishing (CP) process may be performed to produce cross sections of the lithium composite oxide particles. The image of the cross sections is taken by SEM. From the above SEM image of the cross section, 20 primary particles are selected at random. The particle boundaries of the selected 20 primary particles are observed, and the external shape of the primary particles is determined. Then, the longitudinal size of 20 primary particles is measured, and the average of the measurements is defined as the particle size of the primary particles.

When the lithium composite oxide particles B include the secondary particles b2, which are aggregations of the primary particles b1, the secondary particles b2 may have any particle size, provided that the particle size is smaller than that of the secondary particles a2 of the lithium composite oxide particles A. For example, to effectively suppress the amount of gas generated when the battery is stored at high temperature after being charged to a high voltage, or to improve the battery capacity and charging/discharging cycle characteristics, the secondary particles b2 preferably have a particle size within the range of 8.0 to 17.5 μm. For example, to effectively suppress the amount of gas generated when the battery is stored at high temperature after being charged to a high voltage, or to improve the battery capacity and charging/discharging cycle characteristics, the secondary particles a2 of the lithium composite oxide particles A preferably have a particle size within the range of 3.0 to 6.0 μm. Herein, the particle size of the secondary particles is an average particle size measured by the following method.

Specifically, from the above SEM image of the cross section, 20 secondary particles are selected at random. The particle boundaries of the selected 20 secondary particles are observed, and the external shape of the secondary particles is determined. Then, the longitudinal size of 20 secondary particles is measured, and the average of the measurements is defined as the particle size of the secondary particles.

The lithium composite oxide particles A preferably have a volume average particle size of, for example, 10 to 18 μm. The lithium composite oxide particles B preferably have a volume average particle size of, for example, 4 to 7 μm. The volume average particle size can be measured by, for example, laser diffraction method using MT3000II manufactured by MicrotracBEL Corp.

The secondary particles a2 of the lithium composite oxide particles A each preferably include 1000 to 500000 primary particles a1. When the number of the primary particles a1 per secondary particle is too low, for example, the secondary particles a2 become finer, and charging/discharging cycle characteristics may be degraded. When the number of the primary particles a1 per secondary particle is too high, the surface area increases excessively, and addition of zirconium or boron may be less sufficiently effective in suppressing metal elution.

When the lithium composite oxide particles B include the secondary particles b2, which are aggregations of the primary particles b1, the secondary particles b2 each preferably include, for example, 2 to 20 primary particles b1. When the number of the primary particles b1 per secondary particle is too high, the surface area increases, and the amount of metal eluted from the lithium composite oxide particles B may increase.

The mass ratio of the lithium composite oxide particles A to the lithium composite oxide particles B is not particularly limited, provided that the ratio is within the range of 8:2 to 4:6. For example, to improve the battery capacity or charging/discharging cycle characteristics while effectively suppressing the amount of gas generated when the battery is stored at high temperature after being charged to a high voltage, the mass ratio is preferably within the range of 7:3 to 5:5.

The Ni content in the lithium composite oxide particles B is preferably higher than the Ni content in the lithium composite oxide particles A. Typically, the higher the Ni content, the more the battery capacity can improve. On the other hand, the higher the Ni content, the larger the amount of metal eluted during storage at high temperature and the larger the amount of gas generated. However, as described above, metal elution from the lithium composite oxide particles B is unlikely to occur compared with that from the lithium composite oxide particles A. Thus, the Ni content in the lithium composite oxide particles B is set to be higher than the Ni content in the lithium composite oxide particles A, and thus, improving the battery capacity while suppressing the amount of gas generated when the battery is stored at high temperature after being charged to a high voltage can be achieved. Specifically, the Ni content in the lithium composite oxide particles B relative to the total moles of metal elements except for lithium is preferably within the range of 40 to 65 mol %. The Ni content in the lithium composite oxide particles A relative to the total moles of metal elements except for lithium is preferably within the range of 35 to 60 mol %.

To suppress the metal elution from the lithium composite oxide particles A, the zirconium content and the boron content in the lithium composite oxide particles A are each preferably, for example, within the range of 0.1 mol % to 2.0 mol %. When the lithium composite oxide particles B contain zirconium or boron, to suppress metal elution from the lithium composite oxide particles B, the zirconium content and the boron content in the lithium composite oxide particles B are each preferably, for example, within the range of 0.1 mol % to 1.0 mol %.

The lithium composite oxide particles A and B may contain another element in addition to Ni, Mn, zirconium (Zr), and boron (B). Examples of such an element include cobalt (Co), aluminum (Al), tungsten (W), silicon (Si), magnesium (Mg), phosphorus (P), titanium (Ti), molybdenum (Mo), scandium (Sc), yttrium (Y), iron (Fe), copper (Cu), zinc (Zn), chromium (Cr), and lead (Pb). Among such elements, to improve, for example, the battery capacity and charging/discharging cycle characteristics, at least one of Co, Al, and W is preferably contained, and at least Co is preferably contained.

When a battery is stored at high temperature after being charged to a high voltage, Mn contained in the lithium composite oxide particles A and B is eluted, and the eluted Mn is deposited on the negative electrode. According to the present embodiment, the amount of Mn eluted from the lithium composite oxide particles A and B can be suppressed, thereby suppressing the amount of Mn deposited on the negative electrode. Specifically, when a battery is stored in an environment at 60° C. for 14 days after being charged to a battery voltage of 4.3 V, the amount of Mn can be within the range of 20 to 60 μg per gram of the negative electrode. The amount of Mn within the above range is advantageous to suppress the degradation in the capacity after high-temperature storage.

The amount of lithium composite oxide particles A and B relative to the total amount of the positive electrode active material is preferably, for example, within the range of 50 to 100 mass % and more preferably within the range of 80 to 98 mass %. The positive electrode active material may contain other positive electrode active material particles in addition to the lithium composite oxide particles A and B. Such positive electrode active material particles may be Ni-free composite oxide particles, such as $LiCoO_2$ or $LiMn_2O_4$.

The amount of positive electrode active material relative to the total amount of positive electrode active material layer is, for example, preferably 70 mass % or more and 99 mass % or less and more preferably 80 mass % or more and 98 mass % or less.

An exemplary method for producing the lithium composite oxide particles A and B will be described.

The method for producing the lithium composite oxide particles include a material mixing step of mixing a composite oxide containing Ni and Mn and a lithium compound together to obtain a material mixture and a firing step of firing the material mixture to obtain lithium composite oxide particles containing Ni and Mn.

When the lithium composite oxide particles A are produced, a zirconium compound or a boron compound is added when a composite oxide containing Ni and Mn and a lithium compound are mixed together in the material mixing step, for example. The lithium composite oxide particles B contain zirconium or boron in the same manner.

The particle size of primary particles and secondary particles is controlled by controlling the mixing ratio of the materials in the material mixing step. When the lithium composite oxide particles A are produced, the mixing ratio of a composite oxide containing Ni and Mn to a lithium compound is preferably set such that the molar ratio of the metal elements in the composite oxide containing Ni and Mn/Li is within the range of 1.0:1.0 to 1.0:1.2. When the lithium composite oxide particles B are produced, the mixing ratio of a composite oxide containing Ni and Mn to a lithium compound is preferably set such that the molar ratio of the metal elements in the composite oxide containing Ni and Mn/Li is within the range of 1.0:1.0 to 1.0:1.3.

The particle size of primary particles and secondary particles can also be controlled by, for example, controlling the firing temperature in the firing step. For example, when the lithium composite oxide particles A are produced, the firing temperature is preferably within the range of 700° C. to 1100° C. In such a case, the firing time is preferably O1 to 48 hours. For example, when the lithium composite oxide particles B are produced, the firing temperature is preferably within the range of 800° C. to 1100° C. In such a case, the firing time is preferably 1 to 48 hours.

The electrically conductive material contained in the positive electrode active material layer may be a carbon powder, such as carbon black, acetylene black, KETJEN-BLACK, or graphite. Such compounds may be used alone or in a combination of two or more.

The binder contained in the positive electrode active material layer may be a fluorinated polymer or a rubber polymer. Examples of the fluorinated polymer include polytetrafluoroethylene (PTFE), polyvinylidene fluoride (PVDF), and denaturants of the above compounds. Examples of the rubber polymer include ethylene-propylene-isoprene copolymers and ethylene-propylene-butadiene copolymers. Such compounds may be used alone or in a combination of two or more.

The positive electrode 11 according to the present embodiment can be obtained by, for example, applying and drying a positive electrode mixture slurry containing materials, such as a positive electrode active material, an electrically conductive material, and a binder, to form a positive electrode active material layer on the positive electrode current collector and rolling the positive electrode mixture layer.

[Negative Electrode]

The negative electrode 12 may include a negative electrode current collector and a negative electrode active material layer formed on such a negative electrode current collector. For the negative electrode current collector, a foil of a metal that is stable within the negative electrode potential range, such as copper, or a film having a surface on which such a metal is disposed may be used. The negative electrode active material layer may include a negative electrode active material, a binder, and a thickener.

The negative electrode active material may be any material that can bind and release lithium ions. Examples of the negative electrode active material include metal lithium, lithium alloys, such as lithium-aluminum alloys, lithium-lead alloys, lithium-silicon alloys, and lithium-tin alloys, carbon materials, such as graphite, graphite fluoride, coke, and calcined organic substances, and metal oxides, such as $SnO_2$, SnO, and $TiO_2$. Such compounds may be used alone or in a combination of two or more.

Like in the case of the positive electrode, the binder may be a fluorinated polymer or a rubber polymer and may be a styrene-butadiene copolymer (SBR) or a denaturant thereof.

The thickener may be carboxymethyl cellulose (CMC) or polyethylene oxide (PEO). Such compounds may be used alone or in a combination of two or more.

The negative electrode 12 according to the present embodiment can be obtained by, for example, applying and drying a negative electrode mixture slurry containing materials, such as a negative electrode active material, a binder, and a thickener, to form a negative electrode active material layer on the negative electrode current collector and rolling the negative electrode active material layer.

[Nonaqueous Electrolyte]

The nonaqueous electrolyte contains a nonaqueous solvent and an electrolyte salt dissolved in the nonaqueous solvent. The nonaqueous electrolyte is not limited to a liquid electrolyte (nonaqueous electrolyte solution) and may be a solid electrolyte produced by using a gel polymer.

Examples of the nonaqueous solvent include esters, ethers, nitriles, such as acetonitrile, amides, such as dimethylformamide, and mixture solvents of two or more of the above compounds. The nonaqueous solvent may contain a halogen-substituted derivative in which hydrogens of such a solvent are at least partially substituted with halogen atoms, such as fluorine.

Examples of the above esters include cyclic carbonate esters, such as ethylene carbonate (EC), propylene carbonate (PC), and butylene carbonate, linear carbonate esters, such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylic acid esters, such as γ-butyrolactone (GBL) and γ-valerolactone (GVL), and linear carboxylic acid esters, such as methyl acetate, ethyl acetate, propyl acetate, methyl propionate (MP), ethyl propionate, and γ-butyrolactone.

Examples of the above ethers include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers, and linear ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The above halogen-substituted derivative is preferably a fluorinated cyclic carbonate ester, such as fluoroethylene carbonate (FEC), a fluorinated linear carbonate ester, and a fluorinated linear carboxylic acid ester, such as fluoromethyl propionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (1<x<6, n equals 1 or 2), $LiB_{10}Cl_{10}$, LiCl, LiBr, LiI, chloroborane lithium, lithium lower aliphatic carboxylate, boric acid salts, such as $Li_2B_4O_7$ and $Li(B(C_2O_4)F_2)$, and imide salts, such as $LiN(SO_2CF_3)_2$ and $LiN(C_lF_{2l+1}SO_2)(C_mF_{2m+1}SO_2)$ {l and m are each an integer of 0 or higher}. Such lithium salts may be used alone or in a combination of two or more. Among such compounds, from the viewpoint of properties, such as ionic conductivity and electrochemical stability, $LiPF_6$ is preferably used. The concentration of the lithium salt is preferably 0.8 to 1.8 mol per liter of the nonaqueous solvent.

[Separator]

For the separator 13, a porous sheet having ion permeability and insulating properties may be used. Specific examples of the porous sheet include microporous thin films, woven fabrics, and nonwoven fabrics. The material of the separator is preferably, for example, an olefin resin, such as polyethylene or polypropylene, or cellulose. The separator may be a multilayer body including a cellulose fiber layer and a thermoplastic resin fiber layer, such as an olefin resin fiber layer. The separator may be a multilayer separator including a polyethylene layer and a polypropylene layer, or a separator having a surface to which a material, such as an aramid resin or ceramic, is applied.

EXAMPLES

Hereinafter, with reference to Examples, the present disclosure will be further described. The present disclosure is not limited to the following Examples.

Example 1

[Production of Lithium Composite Oxide Particles A]

$Ni_{0.55}Co_{0.20}Mn_{0.25}O_2$ and LiOH were mixed together such that the molar ratio of Li to the total amount of Ni, Co, and Mn was 1.1:1.0. Thereafter, $ZrO_2$ was added to the mixture such that the concentration of Zr is 0.3 mol %, and mixed together. Then, the resulting mixture was fired at 930° C. for 10 hours in an oxygen atmosphere to obtain the lithium composite oxide particles A.

The lithium composite oxide particles A were embedded in a resin. A cross-section polishing (CP) process was performed to produce cross sections of such particles. The cross sections were observed by SEM. The observation showed that the lithium composite oxide particles A included the secondary particles a2, which were aggregations of 2000 or more primary particles a1. The primary particles a1 of the lithium composite oxide particles A had an average particle size of 0.4 μm. The secondary particles a2 of the lithium composite oxide particles A had an average particle size of 15 μm.

[Production of Lithium Composite Oxide Particles B]

$Ni_{0.55}Co_{0.20}Mn_{0.25}O_2$ and LiOH were mixed together such that the molar ratio of Li to the total amount of Ni, Co, and Mn was 1.15:1.0. Thereafter, the mixture was fired at 1000° C. for 10 hours in an oxygen atmosphere to obtain the lithium composite oxide particles B.

The lithium composite oxide particles B were embedded in a resin. A cross-section polishing (CP) process was performed to produce cross sections of such particles. The cross sections were observed by SEM. The observation showed that the lithium composite oxide particles B included the primary particles b1 and the secondary particles b2, which were aggregations of about 1 to 20 primary particles b1. The primary particles b1 of the lithium composite oxide particles B had an average particle size of 3.5 μm. The secondary particles b2 of the lithium composite oxide particles B had an average particle size of 5.0 μm.

[Production of Positive Electrode]

The lithium composite oxide particles A and the lithium composite oxide particles B were mixed together at a mass ratio of 50:50. Such a mixture was used as the positive electrode active material. The positive electrode active material, acetylene black serving as the electrically conductive material, and polyvinylidene fluoride serving as the binder were mixed together at a mass ratio of 100:1:1. Thereafter, N-methyl-2-pyrrolidone was added to prepare a positive electrode mixture slurry. Next, the positive electrode mixture slurry was applied to each surface of a positive electrode current collector made of an aluminum foil, dried, and thereafter, rolled by using a roller to produce a positive electrode including a positive electrode active material layer formed on each surface of the positive electrode current collector.

[Preparation of Nonaqueous Electrolyte]

$LiPF_6$ was dissolved in a mixture solvent in which monofluoroethylene carbonate (FEC), dimethyl carbonate (DMC), and ethyl methyl carbonate (EMC) were mixed together at a volume ratio of 15:45:40, such that the concentration of $LiPF_6$ was 1.3 mol/l, to prepare a nonaqueous electrolyte.

[Production of Nonaqueous Electrolyte Secondary Battery]

The positive electrode tab was attached to the positive electrode, and the negative electrode tab was attached to the negative electrode. Thereafter, a separator was disposed between the positive electrode and the negative electrode. The resulting structure was spirally wound to produce a spiral-shape electrode body. The electrode body and the nonaqueous electrolyte were enclosed in an outer body produced by laminating an aluminum foil by using a resin, to produce a nonaqueous electrolyte secondary battery.

Example 2

A nonaqueous electrolyte secondary battery was produced in the same manner as that in Example 1, except that a mixture in which the lithium composite oxide particles A in Example 1 and the lithium composite oxide particles B in Example 1 were mixed together at a mass ratio of 60:40 was used as the positive electrode active material.

Example 3

A nonaqueous electrolyte secondary battery was produced in the same manner as that in Example 1, except that a mixture in which the lithium composite oxide particles A in Example 1 and the lithium composite oxide particles B in Example 1 were mixed together at a mass ratio of 70:30 was used as the positive electrode active material.

Example 4

$Ni_{0.55}Co_{0.20}Mn_{0.25}O_2$ and LiOH were mixed together such that the molar ratio of Li to the total amount of Ni, Co, and Mn was 1.1:1.0. Thereafter, $ZrO_2$ and $B_2O_3$ were added to the mixture such that the amount of Zr was 0.5 mol % and that the amount of B was 1.0 mol %, and mixed together. Then, the resulting mixture was fired at 930° C. for 10 hours in an oxygen atmosphere to obtain the lithium composite oxide particles A.

The lithium composite oxide particles A in Example 4 were embedded in a resin. A cross-section polishing (CP) process was performed to produce cross sections of such particles. The cross sections were observed by SEM. The observation showed that the lithium composite oxide particles A in Example 4 included the secondary particles a2, which were aggregations of 2000 or more primary particles a1. The primary particles a1 of the lithium composite oxide particles A in Example 4 had an average particle size of 0.4 µm. The secondary particles a2 of the lithium composite oxide particles A in Example 4 had an average particle size of 15.0 µm.

A nonaqueous electrolyte secondary battery was produced in the same manner as that in Example 1, except that a mixture in which the lithium composite oxide particles A in Example 4 and the lithium composite oxide particles B in Example 1 were mixed together at a mass ratio of 50:50 was used as the positive electrode active material.

Example 5

A nonaqueous electrolyte secondary battery was produced in the same manner as that in Example 1, except that a mixture in which the lithium composite oxide particles A in Example 4 and the lithium composite oxide particles B in Example 1 were mixed together at a mass ratio of 70:30 was used as the positive electrode active material.

Comparative Example 1

$Ni_{0.55}Co_{0.20}Mn_{0.25}O_2$ and LiOH were mixed together such that the molar ratio of Li to the total amount of Ni, Co, and Mn was 1.1:1.0. Thereafter, the mixture was fired at 1000° C. for 10 hours in an oxygen atmosphere to obtain the lithium composite oxide particles A.

The lithium composite oxide particles A in Comparative Example 1 were embedded in a resin. A cross-section polishing (CP) process was performed to produce cross sections of such particles. The cross sections were observed by SEM. The observation showed that the lithium composite oxide particles A in Comparative Example 1 included the secondary particles a2, which were aggregations of 2000 or more primary particles a1. The primary particles a1 of the lithium composite oxide particles A in Comparative Example 1 had an average particle size of 0.4 µm. The secondary particles a2 of the lithium composite oxide particles A in Comparative Example 1 had an average particle size of 15 µm.

A nonaqueous electrolyte secondary battery was produced in the same manner as that in Example 1, except that only the lithium composite oxide particles A in Comparative Example 1 were used as the positive electrode active material.

Comparative Example 2

A nonaqueous electrolyte secondary battery was produced in the same manner as that in Example 1, except that only the lithium composite oxide particles A in Example 1 were used as the positive electrode active material.

Comparative Example 3

A nonaqueous electrolyte secondary battery was produced in the same manner as that in Example 1, except that only the lithium composite oxide particles A in Example 4 were used as the positive electrode active material.

Comparative Example 4

A nonaqueous electrolyte secondary battery was produced in the same manner as that in Example 1, except that a mixture in which the lithium composite oxide particles A in Comparative Example 1 and the lithium composite oxide particles B in Example 1 were mixed together at a mass ratio of 70:30 was used as the positive electrode active material.

Comparative Example 5

A nonaqueous electrolyte secondary battery was produced in the same manner as that in Example 1, except that a mixture in which the lithium composite oxide particles A in Comparative Example 1 and the lithium composite oxide particles B in Example 1 were mixed together at a mass ratio of 50:50 was used as the positive electrode active material.

[High-Temperature Storage Test]

At an environmental temperature of 25° C., each battery in Examples and Comparative Examples was charged at a constant current of 0.1 It until the voltage reached 4.3 V. Then, each battery was discharged at a constant current of 0.1 It until the voltage reached 2.5 V. Furthermore, at an environmental temperature of 25° C., each battery in Examples and Comparative Examples was charged at a constant current of 0.1 It until the voltage reached 4.3 V. Thereafter, each battery was placed in a thermostatic chamber set at 60° C. and stored for 14 day. Then, each battery was removed from the thermostatic chamber. The amount of gas generated in each battery was measured by gas chromatography. The results are summarized in Table 1.

TABLE 1

| | Positive electrode active material Composite oxide A Additional element | Mass ratio of composite oxide A to composite oxide B A/B | Amount of gas generated during 14-day storage at 60° C. after 4.3 V charge |
|---|---|---|---|
| Example 1 | Zr | 50:50 | 1.78 |
| Example 2 | Zr | 60:40 | 1.88 |
| Example 3 | Zr | 70:30 | 1.98 |
| Example 4 | Zr + B | 50:50 | 1.25 |
| Example 5 | Zr + B | 70:30 | 1.35 |
| Comparative Example 1 | — | 100:0 | 5.68 |
| Comparative Example 2 | Zr | 100:0 | 3.71 |
| Comparative Example 3 | Zr + B | 100:0 | 2.3 |
| Comparative Example 4 | — | 70:30 | 2.94 |
| Comparative Example 5 | — | 50:50 | 2.46 |

In Examples 1 to 5, a mixture in which the lithium composite oxide particles A containing zirconium or boron and the lithium composite oxide particles B including the primary particles b1 or the secondary particles b2 were mixed together at a mass ratio of 8:2 to 4:6 was used as the positive electrode active material. The primary particles b1 had a smaller particle size than the primary particles a1 of the lithium composite oxide particles A. The secondary particles b2 were aggregations of the primary particles b1 and had a smaller particle size than the secondary particles a2 of the lithium composite oxide particles A. In such Examples 1 to 5, the amount of gas generated when the battery was stored at high temperature after being charged to 4.3 V was more suppressed than that in Comparative Examples 1 to 5.

REFERENCE SIGNS LIST 10 nonaqueous electrolyte secondary battery
11 positive electrode
12 negative electrode
13 separator
14 electrode body
15 battery case
16 main casing
17 sealing body
18, 19 insulating plate
20 positive electrode lead
21 negative electrode lead
22 extending portion
23 filter
24 lower valve member
25 insulation member
26 upper valve member
27 cap
28 gasket

The invention claimed is:

1. A nonaqueous electrolyte secondary battery comprising:
a positive electrode, a negative electrode, and a nonaqueous electrolyte,
wherein the positive electrode includes lithium composite oxide particles A and B, both of the lithium composite oxide particles A and B containing Ni and Mn,
the lithium composite oxide particles A include secondary particles a2 that are aggregations of primary particles a1, and contain at least one of zirconium and boron,
the lithium composite oxide particles B include at least one of primary particles b1 and secondary particles b2, the primary particles b1 having a larger particle size than the primary particles a1, the secondary particles b2 being aggregations of the primary particles b1 and having a smaller particle size than the secondary particles a2, and
a mass ratio of the lithium composite oxide particles A to the lithium composite oxide particles B is within a range of 8:2 to 4:6,
wherein the primary particles a1 of the lithium composite oxide particles A have an average particle size within a range of 0.3 to 0.9 μm, and the primary particles b1 of the lithium composite oxide particles B have an average particle size within a range of 3.0 to 5.0 μm.

2. The nonaqueous electrolyte secondary battery according to claim 1, wherein a Ni content is higher in the lithium composite oxide particles B than in the lithium composite oxide particles A.

3. The nonaqueous electrolyte secondary battery according to claim 1, wherein when the battery is stored in an environment at 60° C. for 14 days after being charged to a battery voltage of 4.3 V, an amount of Mn deposited on the negative electrode is within a range of 20 to 60 μg per gram of the negative electrode.

4. The nonaqueous electrolyte secondary battery according to claim 1, wherein the secondary particles a2 of the lithium composite oxide particles A have an average particle size within a range of 8.0 to 17.5 and the secondary particles b2 of the lithium composite oxide particles B have an average particle size within a range of 3.0 to 6.0 μm.

5. The nonaqueous electrolyte secondary battery according to claim 1, wherein the lithium composite oxide particles A contains boron.

* * * * *